(12) United States Patent
Fraccaroli

(10) Patent No.: US 8,880,101 B2
(45) Date of Patent: Nov. 4, 2014

(54) METHOD AND APPARATUS FOR MANAGING ATTRIBUTES AND FUNCTIONALITIES OF PREDETERMINED GEOGRAPHICAL AREAS

(71) Applicant: Federico Fraccaroli, Irving, TX (US)

(72) Inventor: Federico Fraccaroli, Irving, TX (US)

( * ) Notice: Subject to any disclaimer, the term of this patent is extended or adjusted under 35 U.S.C. 154(b) by 101 days.

(21) Appl. No.: 13/716,168

(22) Filed: Dec. 16, 2012

(65) Prior Publication Data

US 2014/0171119 A1 Jun. 19, 2014

(51) Int. Cl.
*H04W 24/00* (2009.01)
*H04W 4/02* (2009.01)

(52) U.S. Cl.
CPC ..................... *H04W 4/021* (2013.01)
USPC .................. 455/456.3; 455/456.1; 455/456.2; 455/456.4; 455/456.5; 455/456.6; 455/404.2; 455/412.2; 455/414.1

(58) Field of Classification Search
USPC .......... 455/456.1, 456.2, 456.3, 456.4, 456.5, 455/456.6, 404.2, 414.1, 414.2
See application file for complete search history.

(56) References Cited

U.S. PATENT DOCUMENTS

| | | | |
|---|---|---|---|
| 6,061,561 A | 5/2000 | Alanara | |
| 6,539,232 B2 | 3/2003 | Hendrey | |
| 6,542,748 B2 | 4/2003 | Hendrey | |
| 6,542,750 B2 | 4/2003 | Hendrey | |
| 6,647,269 B2 | 11/2003 | Hendrey | |
| 6,774,840 B1 | 8/2004 | Adamczyk | |
| 7,024,195 B2 | 4/2006 | Miriyala | |
| 7,113,797 B2 | 9/2006 | Kelley | |
| 7,203,502 B2 | 4/2007 | Wilson | |
| 7,254,388 B2 | 8/2007 | Nam | |
| 7,328,029 B1 | 2/2008 | Adamczyk | |
| 7,643,834 B2 | 1/2010 | Ioppe | |
| 7,668,537 B2 | 2/2010 | DeVries | |
| 7,813,741 B2 | 10/2010 | Hendrey | |
| 7,848,765 B2 | 12/2010 | Phillips | |
| 7,856,360 B2 | 12/2010 | Kramer | |
| 8,019,692 B2 | 9/2011 | Rosen | |
| 8,126,479 B2 | 2/2012 | Morrison | |
| 8,126,480 B2 | 2/2012 | Morrison | |
| 8,200,248 B2 | 6/2012 | Ioppe | |
| 8,275,361 B2 | 9/2012 | DeVries | |
| 2014/0045472 A1* | 2/2014 | Sharma et al. ................. 455/416 |
| 2014/0095296 A1* | 4/2014 | Angell et al. ............... 705/14.45 |

OTHER PUBLICATIONS

Naya, F. ,Bluetooth-based indoor proximity sensing for nursing context awareness, Paper, Oct. 21, 2005. Proceedings. Ninth IEEE International Symposium, US.
Eagle and Pentland, Social Serendipity: Proximity Sensing and Cueing, MIT Media Laboratory Technical Note 580, May 2004.
Olguin and Pentland, Social Sensors for Automatic Data Collection,Proceedings of the Fourteenth Americas Conference on Information Systems, Toronto, ON, Canada Aug. 14-17.
US 6,731,928, May 2004, Tanaka, "(withdrawn)".

* cited by examiner

*Primary Examiner* — Khalid Shaheed

(57) ABSTRACT

In accordance with one example embodiment of the present invention a method comprises at least partially enabling a set of functionalities and attributes related to a geofenced session area, wherein at least some of those attributes are associated, at least in part, with analytics pertaining to permanence of users within said geofenced session area.

20 Claims, 7 Drawing Sheets

METHOD AND APPARATUS FOR MANAGING ATTRIBUTES AND FUNCTIONALITIES OF PREDETERMINED GEOGRAPHICAL AREAS

TECHNICAL FIELD

The present application generally relates to attributes and functionalities pertaining to predefined geographical areas. In certain implementations, some of these attributes and functionalities can be implemented in connection with temporary location-based networking sessions. In other implementations, some of these attributes and functionalities can be implemented in connection with permanent or recurring location-based networking sessions. In some other implementations, some of said functionalities can be implemented independently from said predefined geographical areas.

BACKGROUND

The teachings of U.S. Pat. No. 6,819,919, U.S. Pat. No. 6,542,750, U.S. Pat. No. 7,813,741, U.S. Pat. No. 6,542,748, U.S. Pat. No. 6,539,232, U.S. Pat. No. 6,542,749, U.S. Pat. No. 8,150,439 and U.S. Pat. No. 6,549,768 are incorporated herein by reference in their entirety. Also the teachings of the papers "Accurate Extraction of Face-to-Face Proximity Using Smartphones and Bluetooth" (Digital Object Identifier: 10.1109/ICCCN.2011.6006081) and "GroupUs: Smartphone Proximity Data and Human Interaction Type Mining" (Digital Object Identifier: 10.1109/ISWC. 2011.28) are incorporated herein by reference in their entirety.

The teachings of patent application "Method and Apparatus for Location based Networking Sessions" with priority date Oct. 2, 2012 of the same inventor are incorporated herein by reference.

Furthermore, where a definition or use of a term in a document, which is incorporated by reference, is inconsistent or contrary to the definition of that term provided herein, the definition of that term provided herein applies and the definition of that term in the reference does not apply.

A geofence is a virtual perimeter for a real-world geographic area. A geofence can be generated as in a radius around a point location such as a bar or a restaurant. A geofence can be a predefined set of boundaries connecting points expressed by latitude and longitude. Geofencing has been made possible especially by the introduction of GPS (Global Positioning System) technology and the miniaturization of electronic components that have made the locationing functionality a standard feature in Mobile Phones and portable electronics in general (User Equipment). Geofencing can be implemented via many other localization techniques, both indoor and outdoor.

In this application the term 'geofencing' or "geofence" is not limited to virtual fences provided by storing one or more geographical locations and parameters that can be retrieved and then compared to actual locations obtained by using GPS positioning but shall include all the possible techniques that may serve the purpose of defining a geographical area by using digital or electronic means such as for example the radio horizon that defines the range of a radio carrier such as, e.g., 3G, 4G, WLAN, Bluetooth and RF-ID around a fixed or mobile point.

Geofencing technology can trigger or inhibit functionalities of location aware apparatuses. For example, as described in U.S. Pat. No. 7,813,741 titled "System and Method for Initiating Responses to Location-Based Events" a system may provide a response to one or more location-based services applications to provide location-based services, such as email, instant messaging, paging and the like.

In other enactments, as described in U.S. Pat. No. 8,150,439 titled "Facilitating user interactions based on proximity" a system is described for providing location-based information and functionalities in various ways. The technique includes enabling multiple people in a common geographic area to interact in various ways, such as via user equipment. In addition, the patent discloses enabling the creation and maintenance of location-based virtual groups of users (also referred to as "clouds"), such as for users of mobile and/or fixed-location devices. Such clouds may enable various types of interactions between group members.

A social network is a social structure made up of a set of actors (such as individuals or organizations) and the ties between these actors. One of means by which these actors can communicate nowadays is the Internet and there are many websites providing a common platform where these actors can interact. A social network provides a way of analyzing the structure of social entities. The study of these structures uses social network analysis to identify local and global patterns, locate influential entities, and examine dynamics.

LinkedIn, for example, is a social networking website for people in professional occupations. It is mainly used for professional networking. One purpose of the site is to allow registered users to maintain a list of contact information of people with whom they have some level of association, called connections. Users can invite anyone (whether a site user or not) to become a connection as long as they possess some data about the targeted connection such as an email address. The contact by a first professional with a second professional within the site often requires either an existing relationship, the sharing of some common traits such as membership to a professional group, or the intervention of another contact related to both professionals. If the invitee rejects the invite, that may count against the inviter. This "gated-access approach" intends to build trust among the service's users.

A list of connections can be used in a number of ways: A contact network is built up consisting of their direct connections, the connections of each of their connections (termed second-degree connections) and the connections of second-degree connections (termed third-degree connections). This can be used to gain an introduction to someone a person wishes to know through a shared contact. Users can also design their own profile to display work and community experiences. LinkedIn can then be used to find jobs, people and business opportunities recommended by someone in one's contact network. Employers can list jobs and search for potential candidates. Job seekers can review the profile of hiring managers and discover which of their existing contacts can introduce them. Users can post their own photos to support identification and credibility. Users can recommend other users.

A feature of LinkedIn is its groups, enabling anyone to start a group based on an association, interest or industry topic. For example, there are thousands of academic and corporate groups that permit alumni and employees to stay in touch. LinkedIn members request an invitation to the group and can receive postings by other members via e-mail.

LinkedIn is just one of the many different social networks. Many other networks exist targeting different facets of human desire for interaction. To date, some of the most popular are: Badoo, Facebook, Foursquare, Friendster, Google+, Myspace, Habbo, Flixter, Flickr, Douban, Myheritage, Meetup and Classmates.com. Some of these social networks have "group forming" capability among its members.

Groups can also be interacting in real life, not only virtually, behind a keyboard. Meetup.com, for example, is an online social networking portal that facilitates offline group meetings in various localities around the world. It allows members to find and join groups unified by a common interest, such as political views, books, games, movies, fitness, pets, careers or hobbies. Users enter a ZIP code or a city name and the topic they want to meet about; the website helps them arrange a place and time to meet. Topic listings are also accessible to users who only enter a position.

The present invention combines, adapts and adds to some of the above-mentioned concepts, technologies and observations by way of a synergetic and novel approach.

SUMMARY

Various aspects of examples of the invention are set out in the claims.

According to a first aspect of the present invention, a method comprises: at least partially enabling a set of attributes related to a geofenced session area that can be joined by users who belong to at least one predetermined group via a mobile equipment apparatus associated with said users if said mobile equipment is determined to be positioned within said geofenced session area, wherein said attributes are associated, at least in part, with analytics pertaining to permanence of said users within said geofenced session area.

According to a second aspect of the present invention, an apparatus comprises at least one processor; and at least one non-transitory computer-readable medium including a computer program code; the at least one non-transitory computer-readable medium and the computer program code configured to, with the at least one processor, cause the apparatus to perform at least the following:

at least partially enabling a set of attributes related to a geofenced session area that can be joined by users who belong to at least one predetermined group via a mobile equipment apparatus associated with said users if said mobile equipment is determined to be positioned within said geofenced session area wherein said attributes are associated, at least in part, with analytics pertaining to permanence of said users within said geofenced session area.

According to a third aspect of the present invention, a computer software system has a set of instructions for controlling at least one general-purpose digital computer in performing desired functions comprising a set of instructions formed into each of a plurality of modules, each modules comprising:

a process for at least partially enabling a set of attributes related to a geofenced session area that can be joined by users who belong to at least one predetermined group via a mobile equipment apparatus associated with said users if said mobile equipment is determined to be positioned within said geofenced session area wherein said attributes are associated, at least in part, with analytics pertaining to permanence of said users within said geofenced session area.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Example embodiments of the present invention and its potential advantages are understood by referring to FIGS. 1 through 7 of the drawings.

Figure 1:
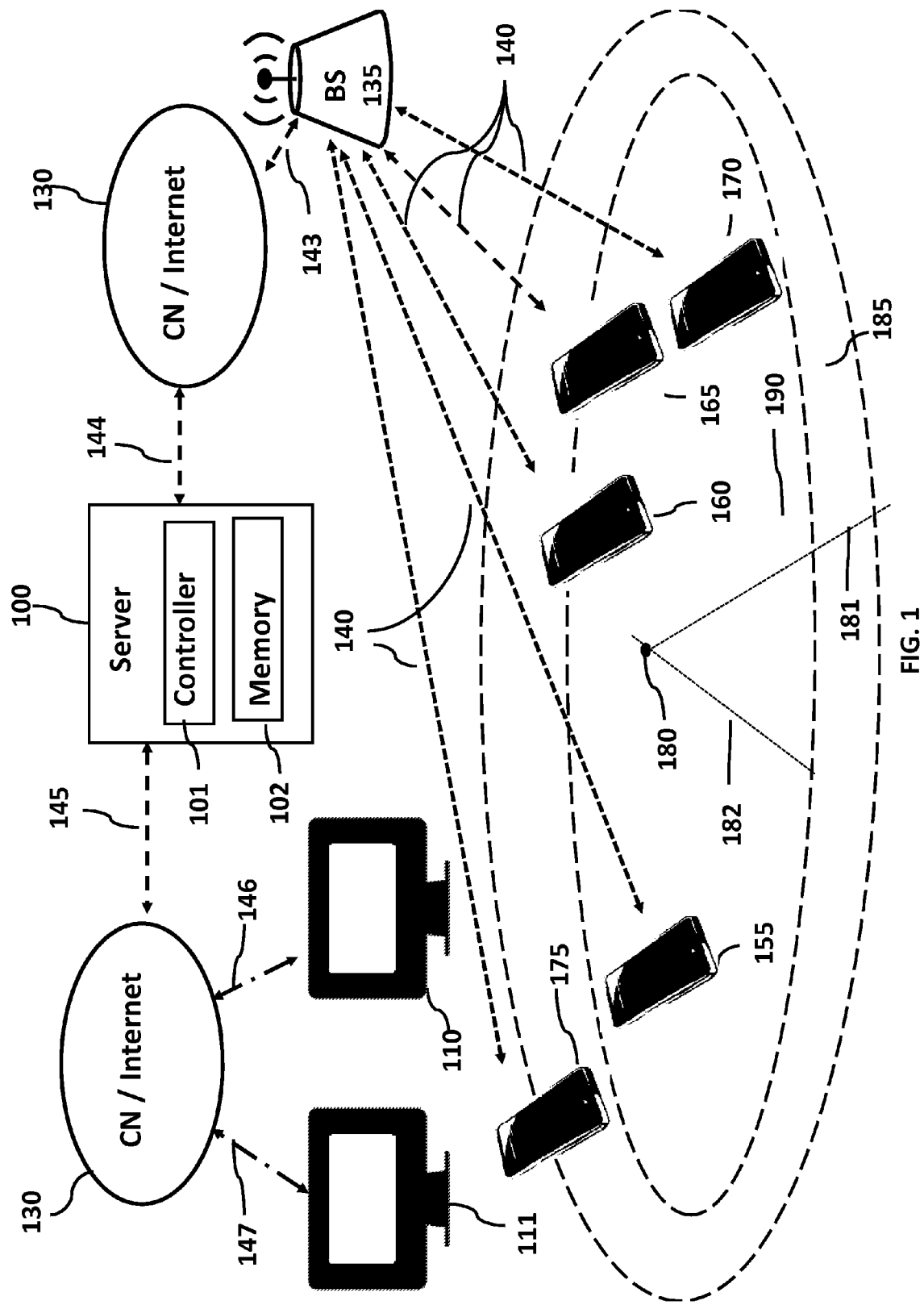
FIG. 1 represents a possible embodiment of an aspect of the invention in which a plurality of user equipment is located in proximity within a geofenced area location.

FIG. 1 describes a possible embodiment of the invention. User Equipment 175, 155, 160, 165, 170 can be a mobile phone, a PDA, a laptop, or a tablet or any other wireless mobile device or wearable equipment as long as capable of connecting with the Internet.

Location 180 is not to be limited or restricted to a central point or a point of symmetry in a symmetrical geometric figure such as the circles in FIG. 1 representing Session Area 190. Both areas may have an asymmetrical shape as defined by geofencing or other technology like radio horizon. It may be centered on a public place, an event place (such as a convention or a large gathering of people sharing a common interest such as the Texas Bar Association Annual Meeting), a business place where a meeting may occur or a private address.

Session Area 190 can be in at least two different statuses: active status and passive status. When in active status, mobile equipment positioned within the zone will be able to log into or "check-in" into the location based networking session. In some implementations, unless user equipment is determined to be located within the boundaries of said active Session Area 190 the check-in shall, as a rule, be inhibited.

Notification Area 185 is a zone, usually surrounding Session Area 190 (or extending Session Area 190) in which user equipment can be notified of many different occurrences such as that a session area is nearby, is active, or is scheduled to turn active in a proximate future. Said notification activity can be regulated according to time windows and statuses. As non-limiting examples, notifications may occur only during daytime (e.g., 08.00 AM-09.00 PM,); or only if the session event zone is scheduled to become active within a predetermined time period, e.g., forty-eight hours; or only until a predetermined time window before the end of the active session, e.g., thirty minutes before the end of the active session.

Session Area 190 is represented in FIG. 1 as having a circular shape with Radius 182 and is centered on Location 180. Session Area 190 is an area where mobile equipment such as User Equipment 155, 160, 170 and 165 can check-in (manually or automatically) and be part of a location based group session event if the position of said User Equipment 160 and 165 is determined to be within the boundaries of said Session Area 190 and if said Session Area 190 is set into an active status by the system. Certain session areas may always be in active status. Other session areas may have windows of active and passive statuses.

In some implementations, Session Area 190 may be used irrespectively of active and passive status to perform certain background functions. As will be explained more thoroughly in connection with FIG. 3 and FIG. 6, the entering within Session Area 190 by a user may serve the purpose of building up a statistical profile of the physical place that can be centered on Location 180, a bar or a restaurant, for example. Said statistical profile may serve the purpose of enabling searches or triggering notifications in certain implementations. A Session Area 190 can be characterized by attributes and functionalities.

Attributes pertain to qualities of the area such as the density of a certain typology of users, e.g., users belonging to a particular group such as the LinkedIn group "IP Lawyers". Attributes can be real time attribute ("snapshot attribute") or a statistical attribute. As an example of a real time attribute, if a law firm is currently having a party in said Session Area 190 a real time attribute of said area can be the high density of lawyers belonging to said LinkedIn group of IP Lawyers. If a bar positioned in Location 180 becomes the happy hour place where said IP lawyers hang out around 4.00 PM every workday of the week then Session Area 190 may statistically become the place where said LinkedIn group becomes prevalent (established) for said days and time window. This is a statistical attribute.

Functionalities are capabilities of a computer program or application to provide a useful function, e.g., as a notification trigger. Said functionalities can be associated with said Session Area 190 or said Notification Area 185. For example, User Equipment 175 at time T1 is located in Notification Area 185. Because of its location within Notification Area 185 at time T1 and because a certain trigger condition has been met and because User Equipment 175 may contain a software application logged on Memory 430, User Equipment 175 may receive a notification via Radio Link 140 established between User Equipment 175 and Access Point/Base Station (AP/BS) 135. Radio Link 140 represents generally a link between a base station in a cellular network (, or an access point in a non-cellular network) and a generic user equipment. Access Point/Base Station (AP/BS) 135 is a generic proxy for an internet connection gateway. Although throughout the present patent application said "Radio Link 140" nomenclature is used unvaryingly, the person skilled in the art will recognize that "Radio Link 140" may be associated with different kinds of digital signal and purposes for different user equipments.

In one exemplary implementation, said notification functionality may occur because at time T1 the presence of User Equipment 155, 160, 165, 170, associated with users who belong, e.g., to said LinkedIn group "IP Lawyers" within Session Area 190 raises an attribute of the area above a predetermined trigger condition. For example, the attribute can be the number of users belonging to said group checked-in into the session area. If user of User Equipment 175 is associated with the same LinkedIn group, he may have an interest in being alerted whenever certain trigger conditions pertaining to his own LinkedIn groups are met and he is within the notification area associated with said session area.

Many other examples are possible. The person skilled in the art will understand that this example is not limiting. For example, a user can be interested in being notified about an attribute level pertaining to a group to which he does not belong to but that has some affinity with his professional or personal interests. For example, an IP lawyer can be interested in being alerted about the presence of specific entrepreneurs groups who may be in need of his services. In another implementation, said notification can be independent of the notification Zone 185 and an algorithm running, e.g., in Server 100 can send an SMS or an email when a triggering condition pertaining to a session zone attribute is met.

In a practical scenario, a user can be able to browse the real time attributes or statistical attributes of various session zones and decide, e.g., where he should be spending his happy hour time, and in so doing, maximizing the possibility of advantageously investing his time. This scenario shall be explained more thoughtfully with reference to FIG. 3.

In another implementation, an attribute of the session zone can be the presence of a particular user within Session Zone 190 at a particular moment in time. Said user may have an interest in making his presence known when he checks-in into Session Area 190. He can adjust the privacy settings and allow alerts to be delivered to other users. For example, an attorney can use a public place, e.g., a bar as his informal hangout place and as an extension of his office space. He can do this to meet new prospective clients in informal settings. A prospective client who may have an interest in meeting that particular attorney in a less formal environment may set up a trigger condition so that he will be alerted when said attorney checks-in into the session area via an email, SMS or other. Prospective clients may also be alerted when they are passing through Notification Area 185 and the target user is currently checked-in into Session Area 190. Alternatively, the particular attorney may set his privacy settings so that users, while browsing the attributes for a recurrent session zone, may be able to retrieve his personal details among the people who are currently checked-in.

In another implementation, a user may want to become recognized as one of the most persistent ("established") users for a specific recurrent session zone, a notorious happy hour place in the city, for example, as determined by permanence analytics algorithms running on Server 100.

For the sake of simplicity, Access Point/Base Station (AP/BS) 135 in FIG. 1 is serving both Session Area 190 and Notification Area 185. In addition, Radio Link 140 defines a generic radio links between user equipment, (e.g. 155, 160, 165, 170 and 175) and Access Point/Base Station (AP/BS) 135. Clearly said generic Radio Links 140 may convey different signals and serve different functions according to the different scenarios.

Notification Area 185 can be an area of circular shape centered on Location 180 having a Radius 181. Many other shapes for the Notification Area 185 are possible. Notification Area 185 may not overlap with Session Area 190 but can be the area resulting from carving out Session Area 190 having Radius 182, a circle in this example, from the area having Radius 181, also a circle. The person skilled in the art will realize that many possible alternatives exist to circular shapes and the overlapping of areas.

A user in Session Area 190 might find desirable receiving an alert that Session Area 190 has switched into an active status, e.g., when he is already in the session area. In addition, Notification Area 185 may or may not contain Location 180 that, in this implementation, represents a proxy for a fixed physical location where, for example, members of one or more predefined groups, such as the ones represented in FIG. 1 as carrying User Equipment 155, 160, 165 and 170 can choose to interact. Said location can be, e.g., a conference room in a company environment, a public place such as a bar or a private household hosting an event.

Notification Area 185, in one implementation, is an area enclosing and extending beyond Session Area 190. User equipment 175, while positioned within Notification Area 185, can be notified, for example, that a Session Area 190 exists, that it is in proximity, that it is in a certain status, (for example that it is in an active status, or that it will switch to an active status in a period T1,) that it will remain in active status for a residual period T2 or that it will switch to a passive status at time T3. While within Notification Area 185, user of User Equipment 175 may also be able to browse the users who have already checked-in into Session Area 190. Said functionality can be excluded e.g., if User Equipment 175 is outside of said Notification Zone 185 according to various settings. In some implementations, location based group sessions can be restricted to members of one or more predetermined groups. These groups can be groups that have formed on social networks such as LinkedIn groups, Meetup groups or Facebook groups and did exist before the start of the location based session event. In some implementations, the groups may just form for attending a particular session event. In other implementations, some individuals may be given an ad hoc permission to join a specific session event while the session has already started to join the predetermined group.

A group can also be defined by those users who are in possess of a particular pass code or password that may be necessary to check-in into a session area. For the purpose of this application, the word "group" shall have a general meaning A group can be the whole body of users of a social network such as LinkedIn or Facebook, or a specific group within one of these social networks whether based on professional associations, social or cultural interests or degrees of separation within the social network. For example, a group can be the body of users who are either in a first or second-degree connection with a determined user. A group can be the collection of users of the mobile software application stored on Memory 430 who is logged in via a "Login" and a "Password" wherein said application enables the functionalities described in this patent application that pertain to the user equipment.

The scenarios pertaining to the attending a location based session event can be numerous. As non limiting examples, the check-in may permit the browsing of a list of other users who also have checked-in into the location based session event; it may permit the retrieving of profiles or at least portions of profiles associated with those users who have checked-in; it may also permit the exchanging of files and the sharing of common media being streamed; it may permit the possibility of requesting a face-to-face meeting with other checked-in users or the messaging during or even after the active status has ended according to predetermined settings. Said messaging capability may comprise both "one-to-one" messaging and a chat room type messaging capability.

In one implementation, a log of all the users who did checked-in automatically or manually in Session Area 190 can be stored on User Equipment 165 or on Server 100 and can be retrieved by authorized users for future usage. Authorized users can be, e.g., other members of the groups who were part of the location based group session but did not have a chance to interact with all the members who checked-in during the time allocated to the event (during the active period). In another scenario, a user can be restricted to being able to retrieve the list of only those users who were checked-in at the same time when said user was checked-in. In another scenario, those lists can be available only to premium subscribers.

The person skilled in the art will recognize that many implementations are possible using the different kind of locationing technologies and radio carrier's standards that are available. For example, User Equipment, 155, 160, 165, 170 and 175 may be able to communicate with each other and Server 100 via a 3G, 4G or WIMAX technology. These technologies are named cellular radio because of their capability to hand-over the radio link from cell to cell (base stations) when user equipment is moving. In this implementation, described in FIG. 1, digital information from and to User Equipment 155, 160, 165 and 170 can be communicated via an Access Point/Base Station (AP/BS) 135 to Server 100 via Links 140 and Core Network/Internet Cloud 130.

Links 143, 145 and 144 can be radio links or any physical means capable of transporting information, including cables. Communications between user equipment can occur via a core network infrastructure supporting any of the above-mentioned cellular standards but can also occur using non-cellular standards such as Wi-Fi and Bluetooth technology. For example, User equipment 160 and 165 can use an ad-hoc Wi-Fi connection to communicate directly without the support of a cellular network once a check-in has occurred.

Server 100 may store a datagram in Memory 102 comprising a list of permanent, one-time only, or recurring session areas events. It shall include a Controller 101 capable of comparing information (e.g. a location) received from or associated with mobile equipment such as User Equipment 175, User Equipment 155, User Equipment 170, User Equipment 160 or User Equipment 165 with at least some predefined parameters associated with an event. Said parameters and conditions, in one implementation, can be contained into a datagram on Server 100 into Memory 102. User equipment may query said Server 100 every time that data, parameters and conditions need to be retrieved.

Figure 4:
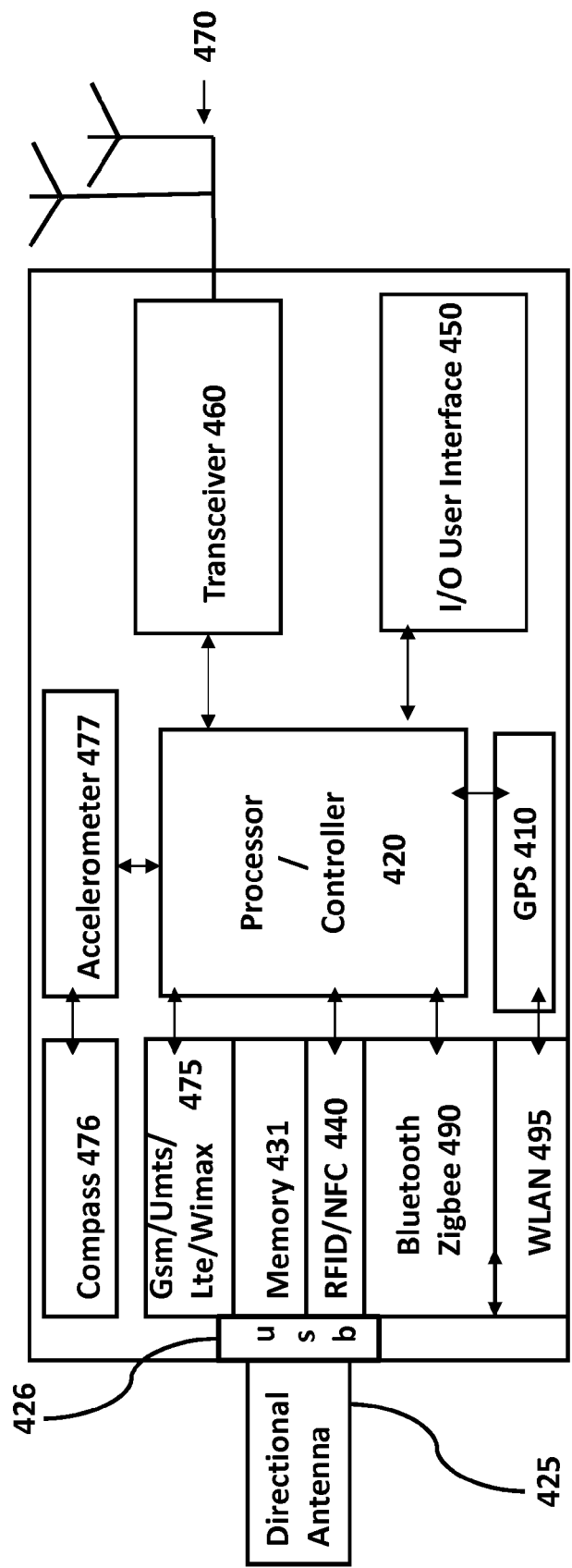
FIG. 4 represents a schematic representation of an embodiment of user equipment such as User Equipment 160, 165, 170, 175 or 180. It may also represent, in some implementations, a schematic representation of an Organizer Equipment 110 since I/O user Interface 450 can provide the functionalities that are necessary to set up active sessions and events.

In another implementation, at least part of said datagram can be downloaded into user equipment and stored into Memory 431 as is illustrated in FIG. 4. For example, if the user equipment communicates its position to Server 100, said Server 100 could send the part of the datagram containing data, parameters and conditions related to events associated with the surroundings of said position to the requesting user equipment. In this case, an application and an algorithm stored into Memory 431 may generate alerts and notifications and permit check-ins and other functionalities eliminating the need for continuously pinging Server 100 for data.

Location parameters and conditions related to events, session areas, notification areas and their functionalities and attributes could be stored on Memory 102 into a data structure, via Link 145 and Link 146 and Core Network/Internet Cloud 130 by an organizer of the event. Organizer Equipment 110 is depicted in FIG. 1 as fixed equipment such as a desktop computer. The person skilled in the art will recognize that Organizer Equipment 110 is not limited to desktop-type devices but can also be any mobile or wearable device capable of connecting to Server 100 via an Internet connection. In addition, Fixed User Equipment 111 represents an alternative to mobile user equipment that can be used by a user in conjunction with said mobile user equipment. Hardware equipment can be interchangeable as long as a software application can be stored, used and retrieved by a user while a login/password function is implemented.

In some implementations, session areas may not necessitate an event organizer. An administrator of the service, not depicted in FIG. 1, may designate locations, such as bars or restaurants, as permanent or recurring session areas and use the present invention as a tool to facilitate networking among patrons in those selected locations as will be described more extensively with reference to FIG. 3.

One way to do that is to rely on services of operators like "Factual". Factual is just one of many possible examples of aggregators and providers of open data, which it provides access to through web service APIs. These kinds of aggregators have datasets about local place information, entertainment and information derived from government sources.

In one implementation, an administrator of the service may create circular-shaped permanent sessions areas where Location 180 coincides with the geographical coordinates of public places in the aggregator's database and Radius 182 is relatively small, e.g., one hundred yards.

FIG. 1 represents just one of the many possible embodiments of the present invention. In fact, Session Area 190 and Notification Area 185 could overlap or be far away from each other so that a plurality of different access points or base stations (AP/BS) could be needed to serve User Equipment 170, 175, 165, 155 and 160 in the two different areas. Moreover, Session Area 190 and notification Area 185 could be defined not only by means of geofencing but also by many other different techniques. For example, the range of the radio communication link type employed by Access Point/Base Station (AP/BS) 135 could be a way to define a circular area around an Access Point/Base Station (AP/BS) 135. If Access Point/Base Station (AP/BS) 135 was positioned in Location 180, Radius 182 can be the radio horizon of the physical carrier employed by Access Point/Base Station (AP/BS) 135. Said horizon could be defining Notification Area 185 or Session Area 190. The gradient of radio signal strength could be used for defining different and overlapping concentrically situated zones. Furthermore, the radio link employed by Access Point/Base Station (AP/BS) 135 could be of many different types, e.g. Wi-Fi, GSM, WCDMA, LTE, CDMA, RF-ID and Bluetooth, just to cite a few non-limiting examples. A possible example concerns the usage of a Wi-Fi access point to define a session area. Memory 102 may store a datagram of network names (SSID) associated with various locations such as Wi-Fi SSID of public places such as bars. When user equipment is in range of the Wi-Fi network and the SSID is recognized as an entry in the database, the system may then allow the checking-in. Multiple techniques can be combined, for example, the above technique can be combined with a GPS check, or a triangulation check.

Many different techniques or combinations thereof can also provide location. For example triangulation with different AP/BS or cell ID or signal strength data from multiple Access Point/Base Stations 135 coupled with databases storing the location of various reference points.

Figure 2:
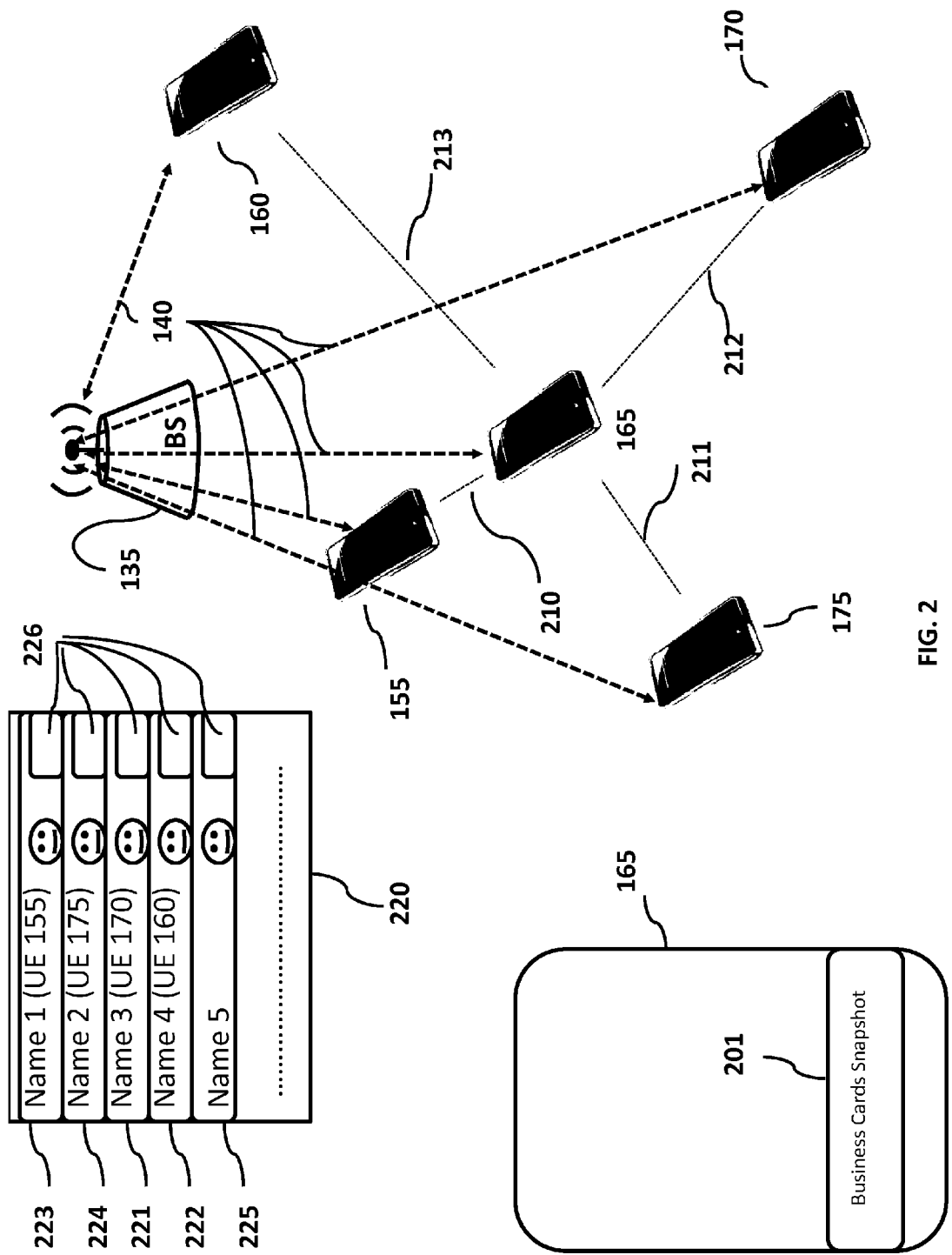
FIG. 2 is a possible embodiment of an aspect of the invention where a user can browse a dynamically adjusting list of proximate users where sail list can, at least in part, be organized, recorded and stored.

FIG. 2 represents one of the possible embodiments of a novel functionality that can be associated with a session area. The person skilled in the art will understand that even though said functionality can be synergistically and advantageously integrated with a session area it may also be a standalone functionality that can be implemented, with some modifications, independently from a session area. With reference to FIG. 2, User Equipment 180, 160, 175, 170 and 165 have all checked-in into Session Area 190. List 220 represents the list of all checked-in users that user of User Equipment 165 can retrieve from Server 100 via Link 140. Said List 220 will comprise users that are proximate to User Equipment 165 (like users that are listed in Fields 223, 224, 221, 222) and users that may be further away like the user listed in Field 225 (Name 5).

List 220 can be organized according to proximity by using, for example, measurements by User Equipment 165 of RSSI (Received Signal Strength Indication) data pertaining, e.g., to Bluetooth or Wi-Fi signal received from User Equipment 160, 155, 175, 170.

RSSI-Measurements 210, 213, 212 and 211 may change over time as users move around or propagation conditions vary. In one implementation, users who are proximate would appear on top of List 220 that represents the users who are checked-in into Session Area 190. By using RSSI measurements and by moving around within Session Area 190, user of User Equipment 165 can determine who is proximate to him since those users will appear on top of the list. In one implementation, by tapping on, e.g., Field 223 on a touch screen of User Equipment 165, a profile associated to Name 1 can be retrieved and displayed so that user of User Equipment 165 may have a better understanding of the characteristics of the person proximate to him. He may then decide to interact face to face with the most promising users.

List 220 can be refreshed periodically using various parameters and algorithms. For example, the list can be refreshed by using a fixed period of time. It can also be refreshed every time an algorithm stored on memory 431 of User Equipment 165 senses a significant variation in received RSSI or a new user equipment signal (e.g. Bluetooth or Wi-Fi) enters within the receiving radio horizon of User Equipment 165.

In another implementation, the algorithm in charge of rearranging the order of the fields composing List 220 that User Equipment 165 displays to its user can be stored in Memory 102 of Server 100. In this implementation, all user equipment may report the measured RSSI of the received surrounding equipment via Links 140 to Server 100. The algorithm may mediate between two reciprocal RSSI measurements and improve the reliability of the measurements. For example, it may mediate among the reciprocal RSSI measurements reported by User Equipment 165 and User Equipment 155 as it may slightly differ.

In another implementation, the rearranging of List 220 according to user proximity can be completely transparent to the user of User Equipment 165 as far as the usage of WLAN or Bluetooth is concerned. A software application stored on user equipment may associate, for example, the Bluetooth ID or the Mac ID of the user equipment to the users profile ID. Said software application running on user equipment shall embody at least some of the features described in this patent application.

In some implementations, the user profile ID can be created when said application is first downloaded and be unique to said application and its associated backend service if it exists. In other implementations the user profile ID can be the same as the one that user has created in connection with other applications. For example, user may reuse the profile data and the combination of username and password that he is using for LinkedIn, Google, Facebook or other services.

In another implementation, said association of user equipment Bluetooth ID or MAC ID with user profile ID can be stored in Memory 102 when the software application is first downloaded on User Equipment 165 and a user profile ID is created.

In one implementation, the analytics of received RSSI during an active session can be used to create a hierarchy among profiles. For example, an algorithm stored on user equipment's Memory 431 or server's Memory 102 can record and use analytics so that during a session the user profile IDs associated with the strongest and most permanent values of RSSI across time will rank higher as compared to user profiles IDs that are associated with RSSI readings that are lower or less permanent. At the end of a session, an algorithm can rank user profiles IDs according to said criteria and weight a value of average RSSI strength versus its permanence. Said ranking and the associated analytics may give an indication of the people with which a particular user did spend his time in close proximity. This can be a substitute to exchanging business cards.

In another implementation user of User Equipment 165 can guide the process of ranking and storing user profile IDs by creating snapshots in time so that the algorithm may weigh more the RSSI parameter as compared to other moments in time. For example, user of User Equipment 165 may press Button 201 at a moment in time when he is interested in storing user profile IDs of other users that are proximate to him in that very moment. In doing so, the algorithm will rank the user profile IDs associated to the users with the strongest instantaneous RSSI higher and will discount the time dimension of the algorithm (RSSI versus permanence).

In another possible implementation user can save virtual business cards or prioritize users' profiles logs by pressing one of Virtual Buttons 226 in Fields 221, 222, 223, 224 and 225 in List 220. Said log may be retrieved, e.g., directly via user equipment or by logging in into an account via User Desktop 111.

Figure 3:
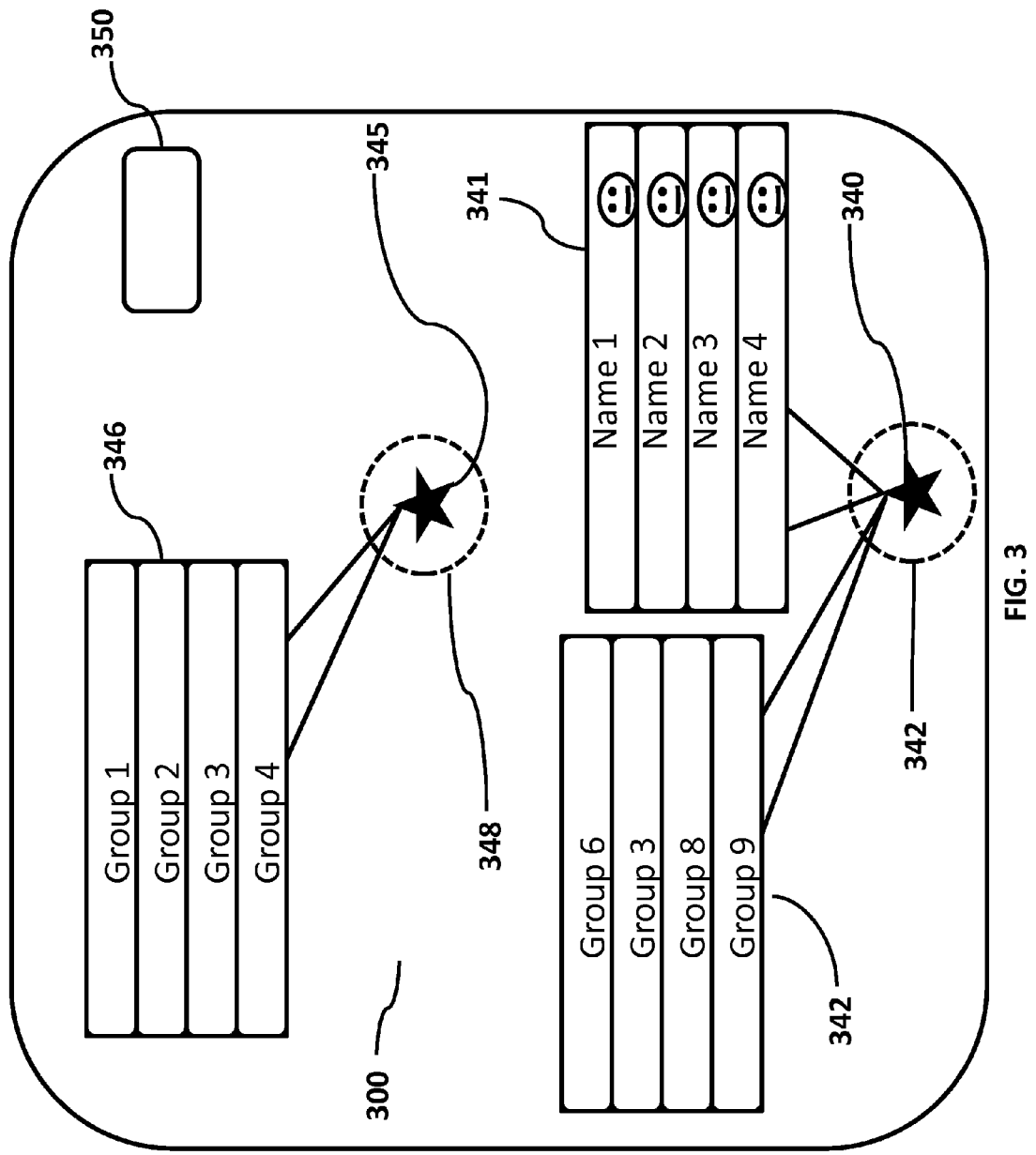
FIG. 3 is a non-limiting example of user equipment's screen shot (I/O User Interface status) delivering exemplary analytics pertinent to geofenced area locations. The person skilled in the art will recognize that, as technology advances, similar information can be conveyed by different means, e.g. via an augmented reality equipment or can be displayed on surfaces by a projector module, so that a traditional screen may not be necessary. In addition, since the information can be delivered via Internet to a desktop, a tablet or else, the person skilled in the art will also understand that FIG. 3 is only one of the possible scenarios.

FIG. 3 represents an example of one implementation of visual indicia that a user apparatus, such as for example User Equipment 165, may convey to a user. Screen 300 may represent a map of the places nearby said user equipment apparatus. In another implementation, Screen 300 may represent visual indicia that Fixed User Equipment 111 may convey to a user who is researching information related to public places or events in a specific area, for example using a ZIP code.

In one implementation, Event 345 represents a permanent or recurring event (e.g., every day from 8.00 AM to 11.00 PM) on top of a public place such as a bar. Circle 348 is a visual representation of the session area users should enter to be able to check-in. List 346 represents an example of an attribute associated with session area associated with Event 345. For example, List 346 may indicate, e.g., that group 1, group 2, group 3, group 4 are the LinkedIn groups to which the patrons of the public place, who also are the users of a software application running on their mobile equipment and performing at least some of the functions described in the present patent application, on average belong to. Said attribute can be measured according to many different analytics and time basis. For example, List 346 may also represent the most prominent groups to which users, who are currently checked-in, belong. Said list can be refreshed periodically by the system. It may represent the most prominent groups to which recurring patrons (and users) belong to on a daily or weekly basis. It may represent the most prominent groups to which recurring patrons (and users) belong to on a monthly or yearly basis. It may be based on discrete numbers of check-ins or it can be based on actual time spent in session by patrons. Prominence can also be based on other factors and parameters as will be discussed in more detail with reference to FIG. 6.

As an additional example, List 342, Event 340 and Circle 342 can be the corresponding elements associated with another permanent or recurring event associated, for example, with a public library. FIG. 3 represents the kind of information that a user would be able to extract by looking at Screen 300. For example, users who are in the process of choosing the venue where to spend their time may compare List 346 and List 342 and assess the kind of clientele, patrons, regular or customer associated with those two places and make an informed decision on which place fits better their networking needs or simply their taste. As discussed, List 346 and List 342 may represent real time or statistical information over time. In some implementations the information displayed and represented via List 342 and List 341 can simply be representative of indicia about whether the place is crowded or not.

List 341 may represent a list of users who choose, according to various privacy settings, to become visible either as recurring patrons or as real time patrons of the place associated with Event 340. For example, professionals like lawyers may use a public place as an extension of their office and use this aspect of the present invention to create an extension of their office. In so doing, they may broaden their reach to potential clients who may be more willing to reach out to a professional in settings that are less formal than an office.

The ordering of users in List 341 may be the result of different algorithms. For example, certain users may become more prominent in List 341 because they are premium subscribers of a service offered in connection with the present invention. Certain users may become more prominent because of the analytics of their permanence associated with Event 340. In a possible implementation, said analytics can be independent from being checked-in into Event 340 (and visible) but can be the result of analytics running in a background mode. For example, a user within session area associated with Event 340 may decide to remain invisible (not checked-in). Nevertheless, if a software application running on his user equipment is running in a background mode, his location can be reported to Server 100 and the analytics related to his user ID accounted for.

Button 350 may be used to enable a function that could be described as virtual teleportation. By enabling said function, users may, e.g., touch Screen 300 (representing a map), and be virtually teleported to that place. For example, by touching Screen 300 within the boundaries of a session area, for example within Circle 348, they may be able to check-in and become visible to users who are at Event 345 in their flesh. In one implementation, virtual users may have a distinguishing label appearing in fields such as Field 223 in FIG. 2 to tell them apart from real flesh attendees. In some implementation this can be a premium feature that can be used to plan for future real life meetings, perhaps at that venue.

FIG. 4 provides a schematic example of a User Equipment 165 apparatus in accordance with one embodiment of the present invention. In a possible implementation, User Equipment 165 is representative of all other user equipment described in previous FIG. 1 and FIG. 2. In addition, Organizer Equipment 110 can also be mobile equipment and the same description may apply.

The person skilled in the art will recognize that by virtue of a possible log in mechanism, users may employ an assortment of equipment as long as said equipment is running a software application contained in a memory such as, e.g., Memory 431 and enabling at least some of the functionalities described in this application. In practice, the using of a login and a password to access and run a software application stored on user equipment makes said user equipment interchangeable.

User Equipment 165 is a general example of a mobile device that users can operate. It could be a traditional mobile phone, a personal digital assistant, a laptop computer, an e-book reader, an entertainment console or controller, wearable hardware such as augmented reality headsets, a tablet computer or any other equivalent portable device that may be used to communicate with other mobile equipment or with Server 100. Organizer Equipment 110 can instead be portable or fixed. User Equipment 165 includes at least one Processor/Controller 420 and at least a Memory 431 comprising computer program instructions. The at least one Processor 420/Controller can be embodied by any computational or data processing device, such as a central processing unit (CPU) or application specific integrated circuit (ASIC). The at least one Processor/Controller 420 can be implemented as one or a plurality of controllers.

Memory 431 may contain application software running on User Equipment 165. Memory 431 may also contain at least portions of a data structure containing details and parameters of events that are most relevant to the location, time and user ID profile associated with said User Equipment 165 on a certain moment in time so that the continuous pinging of Server 100 will not be necessary to ensure a reliable functioning. The at least one Memory 431 can be any suitable storage device, such as a non-transitory computer-readable medium. For example, a hard disk drive (HDD) or random access memory (RAM) can be used in the at least one Memory 431.

The at least one Memory 431 can be on the same chip as the at least one Processor/Controller 420, or may be separate from the at least one Processor/Controller 420. The computer program instructions may be any suitable form of computer program code. For example, the computer program instructions may be a compiled or interpreted computer program. The at least one Memory 431 and computer program instructions can be configured to, with the at least one Processor/Controller 420, to cause a hardware apparatus (for example, User Equipment 165) to perform any process described herein.

User Equipment 165 may include a Radio Frequency Identification (RF-ID) and/or a Near Field Communication (NFC) Module 440 with an antenna (not shown). The RF-ID/NFC Module 440 may operate using traditional RFID frequencies or NFC frequencies. In one implementation these RF-ID/NFC Modules 440 contained in User Equipment 165 may send a wireless digital identifier (ID) associated with a user to an RFID reader located in the premises of Location 180, a bar for example.

An algorithm located on Server 100 may automatically check-in User Equipment 165 that is associated with said wireless digital identifier (ID). An algorithm residing on Server 100 can also associate these IDs to data structures also residing on Server 100 describing user preferences and profiles.

A check-in made by means of an RF-ID reader (or tags) can also be used in combination with Compass 476 and Accelerometer 477 to provide an accurate tracking of the position of users via inertial measurements within enclosed premises where a GPS module or other locationing systems may not work or be sufficiently precisely.

For example, if the range of the RF-ID reader is short (e.g. 2 feet) the system will use the position of the RF-ID reader as the position at the time T of check-in. The system may also use Accelerometer 477 and Compass 476 to track and record any subsequent movement of User Equipment 165 for at least the duration of the active session. In so doing, the system may have a sufficiently precise position of particular user equipment in time. The event location may have more than one RF-ID readers inside the event area so that positions of users can be updated and refined every time that user equipment passes nearby one of these RF-ID readers.

A precise indoor positioning system and Compass 476 can be used to implement a function that can be desirable in crowded venues. For example, when a user requests a meeting with another user within Session Area 190 and said meeting request is accepted, it is desirable that I/O User Interface 450 produce an indication of where the other user is located. If the location of the two users is known with a good level of precision by the system or by a software module running on Memory 431, I/O User Interface 450 may produce indicia such as an arrow pointing at the location of the user to be met and a distance value. Said functionality can be implemented at least in part by hardware components and software routines located either on User Equipment 165 or on Server 100.

In one implementation that will be discussed with reference to FIG. 7 User Equipment 165 can be equipped with a Directional Antenna 425 and related circuitry that can be plugged in, e.g., into USB PORT 426. Directional Antenna 425 can be sensing the RSSI of data pertaining, e.g., to Bluetooth or Wi-Fi signal received from surrounding user equipment such as User Equipment 155, 160, 170, 175.

As discussed with reference to FIG. 2, List 220 can be organized according to measurements by User Equipment 165 of RSSI (Received Signal Strength Indication) data pertaining, e.g., to Bluetooth or Wi-Fi signal. The person skilled in the art will understand that, in case of a directional antenna, such as directional Antenna 425, List 220 can be arranged not only according to proximity but also according to the direction where said Directional Antenna is aiming. The result will be that aiming the directional antenna towards a group of proximate users may result in having those users climbing to the top of List 220.

User Equipment 165 may also include an I/O User Interface 450. I/O User Interface 450 may allow inputting information via a touch screen or a QWERTY keyboard. I/O User Interface 450 may also include a vibrating notification module, or a speaker or a monitor or any combination thereof. User Equipment 165 may include one or more Transceiver 460 configured to operate in conjunction with one or more Antenna 470 to communicate wirelessly. In one embodiment, the Antenna Unit 470 may support beam forming and/or multiple input multiple output (MIMO) operations. As is known to those skilled in the art, MIMO operations may provide spatial diversity, which is to overcome difficult channel conditions and/or increase channel throughput. Antenna 470 may include antenna tuning and/or impedance matching components, RF power amplifiers, and/or low noise amplifiers. User Equipment 165 can be optimized to support multiple transceivers using multiple wireless standards.

In one example embodiment, User Equipment 165 may support simultaneous transmission of cellular (for example, GSM/UMTS/LTE/WiMAX) and non-cellular (for example, WLAN 495 or Bluetooth®/ZigBee 490) radio carriers. A Transmission Module GSM/UMTS/LTE/WiMAX 475 could be the medium by which User Equipment 165 communicates with Server 100. Alternatively, User Equipment 165 may communicate via WLAN 495 module.

WLAN 495 may also be a way by which the system ensures the locationing constrains to the checking-in function. For example only if the MAC ID or SSID data information of an access point that provides Wi-Fi access to a place are detected and those data information match, e.g., the data stored on Server 100 then the check-in may be allowed. WLAN may be used as a proxy for ensuring that location constrains are met.

The locationing component of the invention can be advantageously implemented in many different ways. In one possible implementation, a GPS Module 410 may provide the location of User Equipment 165 to Server 100 via a Data Link 140. When in closed environments, such as a shopping mall, the location data can be provided via other techniques. For example, choke points or grids, location indexing and presence reporting for tagged objects (such as RF-ID readers), can be used to provide location data when indoor. Other examples of techniques used to provide location are angle of arrival, time of arrival and received signal strength indication.

Figure 5:
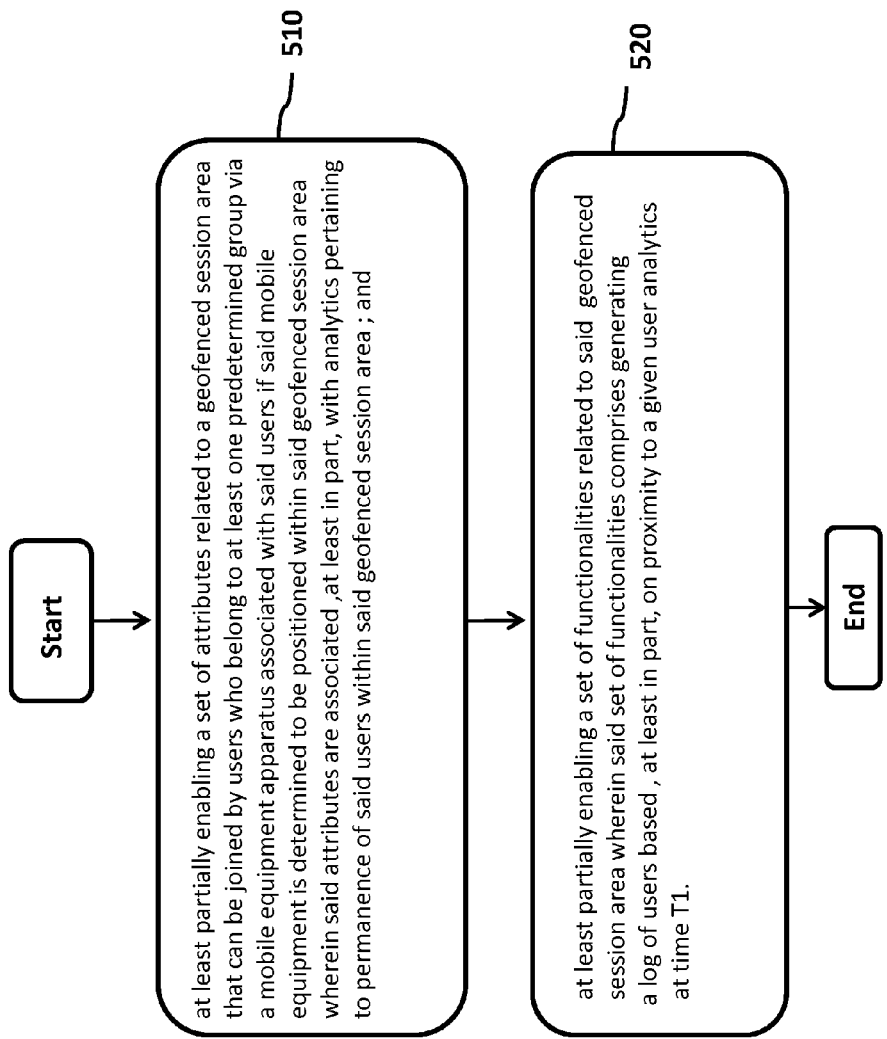
FIG. 5 represents a possible method embodiment of the invention.

FIG. 5 represents one possible method embodiment of the present invention.

The method comprises:

at least partially enabling a set of attributes related to a geofenced session area that can be joined by users who belong to at least one predetermined group via a mobile equipment apparatus associated with said users if said mobile equipment is determined to be positioned within said geofenced session area wherein said attributes are associated, at least in part, with analytics pertaining to permanence of said users within said geofenced session area; (510) and at least partially enabling a set of functionalities related to said geofenced session area wherein said set of functionalities comprises generating a log of users based, at least in part, on proximity to a given user analytics at time T1. (520)

Figure 6:
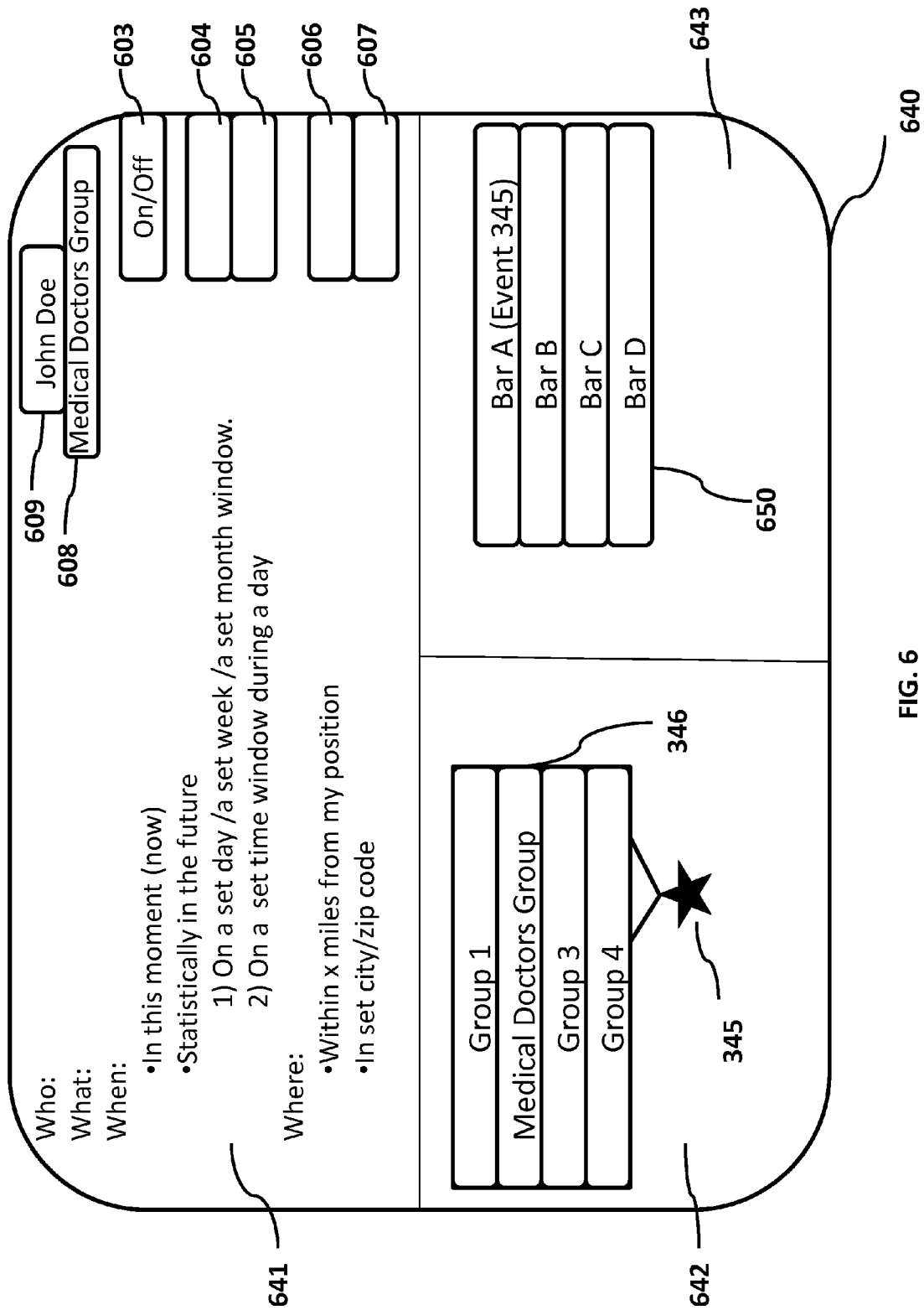
FIG. 6 is another non-limiting example of user equipment's I/O User Interface status. The considerations of FIG. 3 are equally applicable.

FIG. 6 represents an illustration of a possible implementation for a user interface screen that a user apparatus such as User Apparatus 165 or a Fixed User Equipment 111 may display to a user, e.g., after he has run a query in a search engine mining the data and analytics stored, e.g., on Server 100.

In a possible implementation, Screen 640 represented in FIG. 6 is divided into three parts. Sub-screen 641 is where user can run queries and searches. Sub-screen 642 and Sub-Screen 643 illustrate the results of queries and searches.

A possible scenario can be a user, e.g. a medical sales representative, who is in need to travel to a city on a certain day for a conference. In his planning of the trip he is interested in knowing what kind of public places, such as bars or restaurants, he should be spending his free time in order to maximize the probability of networking, in an informal environment, with other users who fit the most his target clientele, medical doctors in this case. He may also want to know this information in order to book a hotel that is close to those locations.

User may be able to run a search using search fields Field 608 (e.g. LinkedIn group: Medical doctors group), Field 604 (e.g. day of the month where he will be in the city: Friday, October 27$^{th}$), Field 605 (Time window during day: 4.00 PM to 8.00 PM) and Field 607 (City where user plans to travel to: Austin).

Search results may appear in Sub-screen 642 in the form of a map displaying Event 345, e.g., a bar close to a major hospital in the city of Austin. Event 345 represents a permanent or recurring event (for example every day from 8.00 AM to 11.00 PM) centered on this bar. List 346 may represent the list of groups that are most likely to be representative of the groups of users who will be populating Event 345 within the temporal and spatial constraints of the user's query above.

Search results may also appear in the form depicted in Sub-screen 643 as List 650 describing, in descending order, the directory of venues (recurring session areas) that best fit the criteria of the search by using the analytics collected over time by analyzing patterns in time and space deducted from data stored, for example, in Memory 102 of Server 100.

In another scenario, the user, a medical sales representative, is in need to know where he should be investing his networking time at a present time. He may run the same query described above but now set Field 603 to "On" and then indicate the radius of the search in Field 607, e.g., 10 miles. Sub-screen 642 may show the place where, in real time, the users belonging to the Medical Doctors Group are most active within the constraints of the query. List 346 may now show a list of groups associated with a location (Event 345) that appears to be most pertinent in real time. Sub-screen 643 may now represent List 650 showing according to distance or degree of relevance (or a combination thereof) events (places) where members of Medical Doctors Groups are most active in real time.

In another possible implementation, if all the privacy settings and permissions allow it, user might be interested in interacting with a specific doctor, e.g. John Doe, who he knows from browsing List 341 of FIG. 3, is a regular patron of venue of recurring Event 340. User may now set an alert using Field 609 for that particular doctor. He may set up an alert that the system will trigger when Dr. John Doe checks-in into Event 340. He also may choose to be alerted via an algorithm running, e.g., on Server 100 when Dr. Doe checks-in into a location event that is within a certain radius from his current position.

Figure 7:
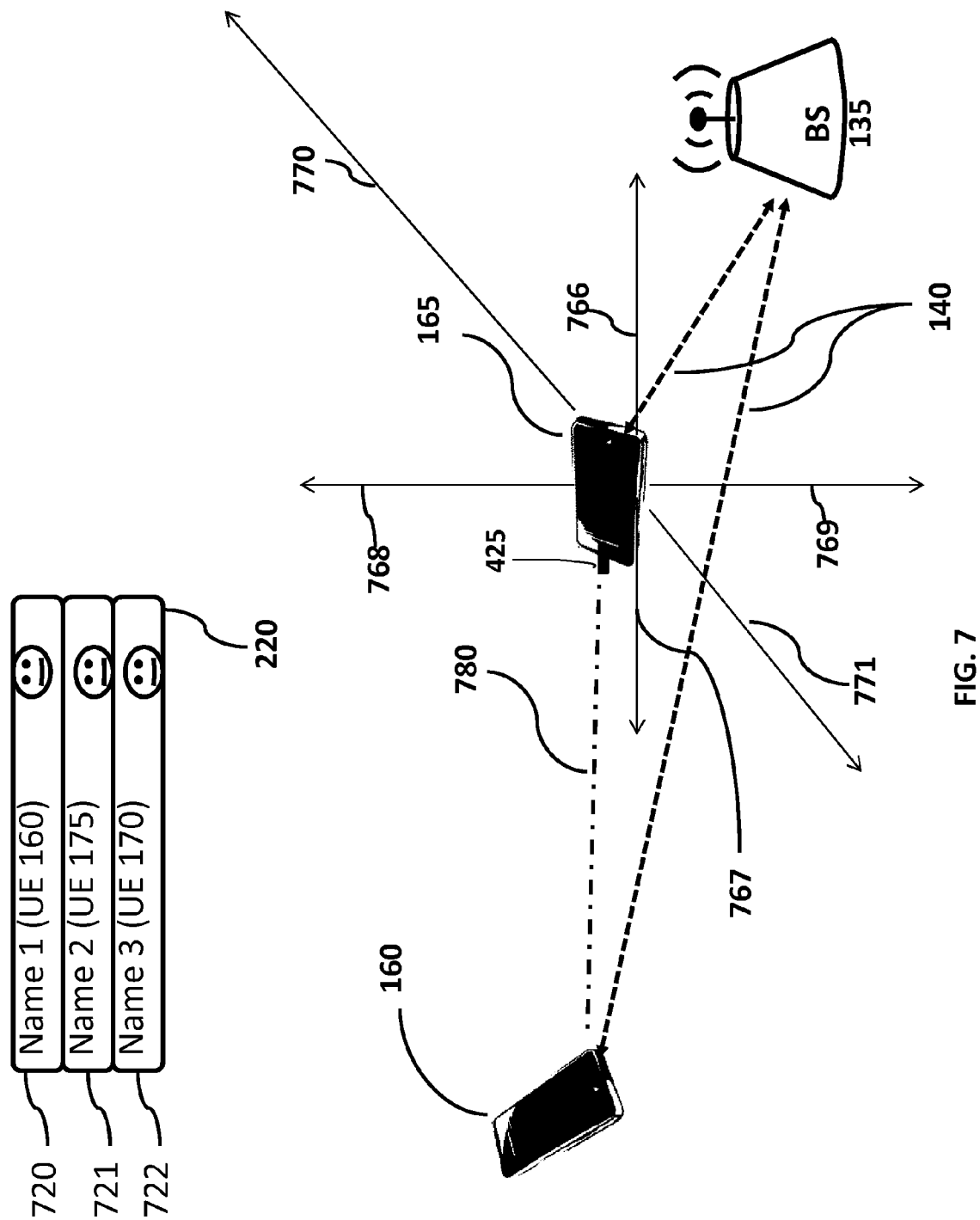
FIG. 7 is another possible embodiment of an aspect of the invention describing a method, system and apparatus for showing and organizing a list of proximate users and for providing an estimated direction pointing to a specific proximate users.

FIG. 7 represents an illustration of a possible aspect and implementation of the present invention. User Equipment 165 may have an interest in knowing who is around him, especially in crowded and large venues where List 220 of FIG. 2 may comprise hundreds of users. In a possible implementation, discussed in FIG. 2 in case of a non-directional antenna and using RSSI Measurement 780, e.g. for a WLAN or Bluetooth signal, it is possible, by running an algorithm stored in Memory 431 of User Equipment 165, to organize List 220 of users who have checked-in into the same event according to values of received RSSI 780.

RSSI 780 is related to proximity as per the teachings of, e.g., "Accurate Extraction of Face-to-Face Proximity Using Smartphones and Bluetooth" (Digital Object Identifier: 10.1109/ICCCN.2011.6006081). Said data can be used to organize List 220 of FIG. 2. In another implementation, the algorithm can also be stored on Memory 102 and run on Server 100. List 220 can be retrieved via Link 140.

In another implementation, still using a non-directional antenna to measure RSSI of User Equipment 160, it is possible to deduct an approximate bearing for the position of a target device, i.e., User Equipment 160. As discussed with reference to FIG. 4, user equipment can be equipped with Accelerometer 477 and Compass 476.

In one implementation, if User Equipment 160 communicates that it is not changing its position to Server 100 (or to User Equipment 165 if the estimating algorithm is running there), while User Equipment 165 is moving along, for example, Vectors 768, 766, 769 or 767 then the changes of RSSI 780 detected by User Equipment 165 can be recorded and correlated with those vectors. If User Equipment 165 moves along Vector 766, RSSI 780 will likely decrease; if it moves along Vector 767, RSSI 780 will likely increase.

By applying statistics principles in a learning algorithm (for example successive iterations of Bayes' theorem) after User equipment 165 has moved along a statistically significant number of vectors (in particular while using a collaborative approach among user equipment such as exchange of data pertaining to vectors and variation of RSSI), the algorithm can compute an approximate bearing of target device User Equipment 160.

In statistics, Bayesian inference is a method of inference in which Bayes' rule is used to update the probability estimate for a hypothesis as additional evidence is learned. Bayesian updating is an important technique throughout statistics, and especially in mathematical statistics: Exhibiting a Bayesian derivation for a statistical method automatically ensures that the method works as well as any competing method, for some cases. Bayesian updating is especially important in the dynamic analysis of a sequence of data.

For example, if User Equipment 165 moves along Vector 770 and RSSI data for User Equipment 160 decreases, the algorithm will start by assuming that Vector 771 represents User Equipment 160's direction with an initial low probability of being accurate. Successive iterations of Bayesian inferences related to other vectors will refine the accuracy of the prediction over time within the constrains and assumptions of the system.

The person skilled in the art will understand that given a collaborative exchange of data between User Equipment 160 and 165 said bearing can be reliably computed as long as at least one of the two user equipment moves around along a significant number of vectors. In some implementations, the data and measurements collected by the two apparatuses can be combined to obtain a shared, mutual and more reliable estimation. The teachings of the paper "Diard, J and Bessiere, P and Mazer, E (2003) A Survey of Probabilistic Models Using the Bayesian Programming Methodology as a Unifying Framework" are incorporated herein by reference.

In another implementation, User Equipment 165 can be equipped with Directional Antenna 425. In this case, the aiming of the antenna toward different directions while an algorithm processes readings of RSSI 780 pertaining to, e.g., Bluetooth signal from User Equipment 160 will allow an estimation of the direction of said equipment. In this implementation, the aiming of Directional Antenna 425 towards different directions may result in the rearrangement of the fields of List 220 accordingly. For example, if it aims in the direction of Vector 767 then Field 720 may jump at the top of List 220 because RSSI readings will be high as compared to readings from other equipment.

Embodiments of the present invention may be implemented in software, hardware, application logic or a combination of software, hardware and application logic. The software, application logic and/or hardware may reside on mobile computer equipment, fixed equipment or servers that may not always be owned or operated by a single entity. If desired, part of the software, application logic and/or hardware may reside on multiple servers and equipment in charge of different processes.

In this patent application, LinkedIn has been mentioned and used frequently in various examples. The person skilled in the art will understand that this is just one of the many possible examples. For example, a service provider who is running a service that is implementing at least some of the functionalities described in this application may provide the users the possibility of creating user profiles within the service. Alternatively, he may provide users the possibility of importing the profiles said users have formerly created from other well-established social networks such as LinkedIn, Facebook and many others, once users' authorizations have been obtained.

In an example embodiment, the application logic, software or an instruction set is maintained on any one of various conventional computer-readable media. In the context of this application, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or can be combined. As technology advances, new equipment and techniques can be viable substitutes of the equipment and techniques that have been described in this application.

Although various aspects of the invention are set out in the independent claims, other aspects of the invention comprise other combinations of features from the described embodiments and/or the dependent claims with the features of the independent claims, and not solely the combinations explicitly set out in the claims. The above described example embodiments of the invention should not be viewed as limiting but merely as explanatory. There are several variations and modifications, which may be made without departing from the scope of the present invention as, defined in the appended claims.

What is claimed is:

1. A method comprising:
at least partially compiling by a computer apparatus a set of attributes related to a session area that can be joined by a first user who belongs to at least one predetermined group via a mobile equipment apparatus that is associated with said first user if said mobile equipment apparatus is determined to be positioned within a boundary of said session area wherein said attributes are associated, at least in part, with data pertaining to a plurality of other users who did join said session area and also belong to at least one predetermined group; and
providing indicia of at least one subset of said set of attributes to said first user.

2. The method of claim 1, wherein said one subset of said set of attributes comprises statistical attributes that are associated with said session area.

3. The method of claim 1, wherein, said one subset of said set of attributes comprises real time attributes that are associated with said session area.

4. The method of claim 1, further comprising at least partially enabling a set of functionalities wherein said set of functionalities comprises generating indicia that at least one attribute among said set of attributes has met a predetermined triggering condition.

5. The method of claim 1, further comprising at least partially enabling a set of functionalities wherein said set of functionalities comprises generating a log related to at least one subset of said plurality of other users wherein said log is accessible to said first user if said at least one subset of said plurality of other users has given privacy permissions associated with said log.

6. The method of claim 1, further comprising enabling a set of functionalities wherein said set of functionalities comprises generating a log of at least one subset of said plurality of other users that is arranged, at least in part, according to a proximity to said first user criteria if said first user did join said session area via said mobile equipment apparatus.

7. The method of claim 1, further comprising
enabling a set of functionalities wherein said set of functionalities comprises generating a log of at least one subset of said plurality of other users that is arranged, at least in part, according to an orientation of a directional antenna that is associated with said mobile equipment apparatus.

8. A computer system having a set of instructions stored in at least one non-transitory computer-readable medium for controlling at least one general-purpose digital computer in performing desired functions comprising a set of instructions formed into each of a plurality of modules, each modules comprising:

a process for at compiling a set of attributes related to a session area that can be joined by a first user who belongs to at least one predetermined group via a mobile equipment apparatus that is associated with said first user if said mobile equipment apparatus is determined to be positioned within a boundary of said session area wherein said attributes are derived, at least in part, from data pertaining to a plurality of other users who did join said session area and also belong to at least one predetermined group; and a process for providing indicia of at least a subset of said set of attributes to said first user.

9. The computer system of claim 8, wherein said subset of said set of attributes comprises statistical attributes that are associated with said session area.

10. The computer system of claim 8, wherein said subset of said set of attributes comprises real-time attributes that are associated with said session area.

11. The computer system of claim 8, further comprising: a process for at enabling a set of functionalities related to said session area wherein said set of functionalities comprises generating indicia that at least one of attribute among said set of attributes has met a predetermined triggering condition.

12. The computer system of claim 8 further comprising: a process for enabling a set of functionalities wherein said set of functionalities comprises generating a log of at least one subset of said plurality of other users wherein said log is accessible to said first user if said at least one subset of said plurality of other users has given privacy permissions associated with said log.

13. The computer system of claim 8, further comprising: a process for at enabling a set of functionalities wherein said set of functionalities comprises generating a log of at least one subset of said plurality of other users that is arranged, at least in part, according to a proximity criteria.

14. The computer system of claim 8, further comprising: a process for at generating a log of at least one subset of said plurality of other users wherein said log of said at least one subset of said plurality of other users is arranged, at least in part, according to an orientation of a directional antenna that is associated with said mobile equipment apparatus.

15. An apparatus, comprising:
at least one processor; and at least one non-transitory computer-readable medium including a computer program code; the at least one non-transitory computer-readable medium and the computer program code configured to, with the at least one processor, cause the apparatus to perform at least the following:
at least temporarily storing a set of compiled attributes related to a session area that can be joined by a first user who belongs to at least one predetermined group via a mobile equipment apparatus that is associated with said first user if said mobile equipment apparatus is determined to be positioned within a boundary of said session area, wherein said attributes are associated, at least in part, with data related to a plurality of other users who did join said session area and also belong to at least one predetermined group; and
providing indicia to said first user of at least a subset of said set of compiled attributes.

16. The apparatus of claim 15, wherein said subset of said set of attributes comprises statistical attributes that are associated with said session area.

17. The apparatus of claim 15, wherein said subset of said set of attributes comprises real time attributes that are associated with said session area.

18. The apparatus of claim 15, further comprising:
said at least one processor; and said at least one non-transitory computer-readable medium including computer program code; the said at least one non-transitory computer-readable medium and said computer program code configured to, with said at least one processor, cause the apparatus to additionally perform at least the following: at least partially enabling a data indexing functionality related to said set of attributes to enable queries associated with said attributes to assist said first user in comparing values of at least a subset of said set of attributes that are related to said session area with values associated to the same subset of said set of attributes for a plurality of other session areas.

19. The apparatus of claim 15, further comprising:
said at least one processor; and said at least one non-transitory computer-readable medium including computer program code; the said at least one non-transitory computer-readable medium and said computer program code configured to, with said at least one processor, cause the apparatus to additionally perform at least the following: at least partially enabling a set of functionalities wherein said set of functionalities comprises generating a log of at least one subset of said plurality of other users, wherein said log is accessible to said first user if said at least said subset of said plurality of other users have given privacy permissions associated with said log.

20. The apparatus of claim 15, further comprising:
said at least one processor; and said at least one non-transitory computer-readable medium including computer program code; the said at least one non-transitory computer-readable medium and said computer program code configured to, with said at least one processor, cause the apparatus to additionally perform at least the following: at least partially enabling a set of functionalities wherein said set of functionalities comprises generating a log of at least one subset of said plurality of other users arranged, at least in part, according to a proximity criteria.

* * * * *

UNITED STATES PATENT AND TRADEMARK OFFICE
CERTIFICATE OF CORRECTION

PATENT NO.        : 8,880,101 B2
APPLICATION NO.   : 13/716168
DATED             : November 4, 2014
INVENTOR(S)       : Federico Fraccaroli Page 1 of 1

It is certified that error appears in the above-identified patent and that said Letters Patent is hereby corrected as shown below:

In the Claims:

CLAIM 11, Column 19, line 19, remove "at" to read: "... process for enabling a set of functionalities related to..";

CLAIM 11, Column 19, line 21, remove "of" to read: "... generating indicia that at least one attribute among said..";

CLAIM 13, Column 19, line 31, remove "at" to read: "... process for enabling a set of functionalities..";

CLAIM 14, Column 19, line 36, remove "at" to read: "... process for generating a log of at least one subset of said..".

Signed and Sealed this
Thirtieth Day of August, 2016

Michelle K. Lee
*Director of the United States Patent and Trademark Office*